United States Patent [19]
Hayashi

[11] 3,844,402
[45] Oct. 29, 1974

[54] BAKERY FLEXIBLE BELT CARRYING PLATE

[76] Inventor: Torahiko Hayashi, 2-3, Nozawa-cho, Utsunomiya-shi, Japan

[22] Filed: Dec. 29, 1971

[21] Appl. No.: 213,277

[30] Foreign Application Priority Data
Jan. 14, 1971  Japan.................................. 46-1172

[52] U.S. Cl................ 198/99, 198/20 R, 198/20 T, 198/203, 198/84
[51] Int. Cl............................................. B65g 37/00
[58] Field of Search.......... 198/99, 167, 20 T, 20 R, 198/84, 203, 193, 127; 107/57; 74/219, 224

[56] References Cited
UNITED STATES PATENTS

| | | | |
|---|---|---|---|
| 499,460 | 6/1893 | Hooper ............................ | 198/20 T |
| 838,221 | 12/1906 | Taylor............................... | 198/193 |
| 1,484,248 | 2/1924 | Austin............................... | 198/193 |
| 1,824,124 | 9/1931 | Cryns................................ | 107/57 A |
| 2,041,091 | 5/1936 | Savy.................................. | 198/167 |
| 2,583,471 | 1/1952 | Collis................................ | 198/203 |
| 2,675,118 | 4/1954 | Morrison .......................... | 198/84 |
| 2,912,722 | 11/1959 | Howell.............................. | 198/193 |
| 2,940,586 | 6/1960 | Vamvakas.......................... | 198/203 |
| 2,955,701 | 10/1960 | Schwertl ........................... | 198/203 |
| 3,115,236 | 12/1963 | Anetsberger...................... | 198/167 |
| 3,348,678 | 10/1967 | Flowers............................. | 198/99 |
| 3,374,878 | 3/1968 | Kornylak .......................... | 198/127 |

Primary Examiner—Evon C. Blunk
Assistant Examiner—Joseph E. Valenza
Attorney, Agent, or Firm—Wyatt, Gerber & Shoup

[57] ABSTRACT

A carrying plate, for use in a bakery, transports formed and fermented dough products and is adapted to be transported by a conveyor means and automatically unloaded. The carrying plate includes a rectangular core plate and an endless flexible belt which is rotatable around the core belt. The plate is advanced on the conveyor means to an unloading station where automatically a roller swings into contact with the lower surface of the belt on the plate to rotate it and unload the dough products.

5 Claims, 8 Drawing Figures

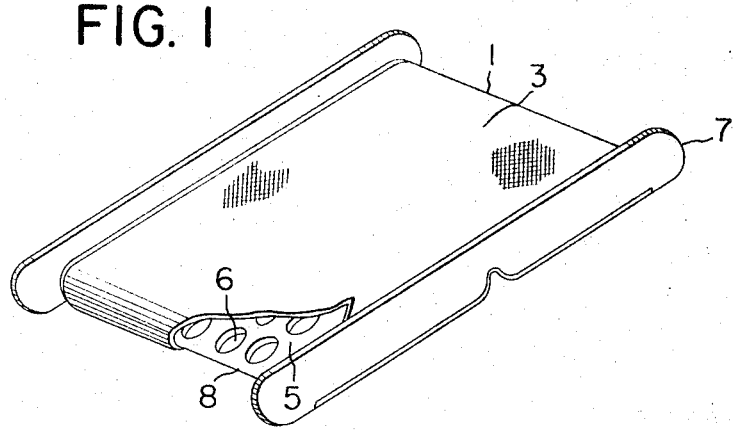
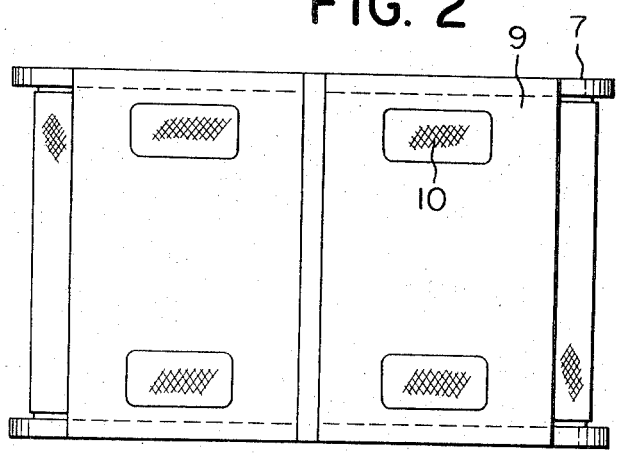
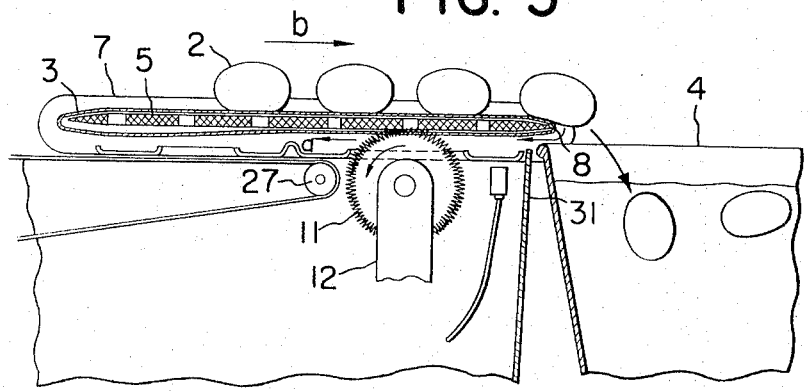

BAKERY FLEXIBLE BELT CARRYING PLATE

The present invention relates to a device for automatically transferring semi-manufactured dough products such as bread and doughnuts to a subsequent processing stage such as a band oven or a fryer.

Divided, formed and fermented dough products in most cases used to stick to the surface of a carrying plate and it has been very difficult to take off dough products from the carrying plate. In order to overcome the above difficulty, a cloth is placed on the carrying plate to separate the dough products from the carrying plate and a little amount of flour or oil is applied to the cloth before dough products are placed on it. However, the use of the cloth still cannot eliminate the sticking of dough products to the cloth to a satisfactory degree due to a long exposure of dough products to heat in the preceding proofing process. Further, it is necessary to pull by hand the cloth from the carrying plate so as to separate dough products from the carrying plate and to take off the cloth. Thus, it requires considerable trouble to take off dough products from the cloth and to replace the cloth with a new one for receiving new dough products. The present invention is intended to resolve such difficulties.

The present invention provides a simple device for automatically transferring semi-manufactured dough products such as bread and doughnuts to a subsequent processing stage such as a fryer or a band oven, comprising a dough product carrying plate assembly having a substantially rectangular, flat core plate and an endless flexible belt rotatable around the upper and lower surfaces and the front and rear ends of the core plate.

The present invention, further, provides a device for automatically transferring semi-manufactured dough products to a subsequent processing stage, comprising a dough product carrying plate assembly as described above, a roller having projections around it, and means for bringing the roller into or out of contact with the lower surface of the belt so as to rotate the belt around the core plate or stop it.

The present invention also provides a device wherein the carrying plate assembly is supported on a conveyor at the transfer position, where the dough products are transferred or discharged to a subsequent processing stage by the rotation of the belt around the core plate of the carrying plate assembly caused by the rotation of the roller engaging the belt. The conveyor is arranged to take an inclined position when the discharge operation of dough products is completed and thus the carrying plate assembly placed on the conveyor is made to slide over to a lower level collecting conveyor for returning the carrying plate assembly to a preceding processing stage.

Another feature of the present invention is that the belt surrounds the core plate of the carrying plate assembly and along with the rotation of the belt around the core plate and the discharge of dough products, spots on the belt are gradually and successively vacated for the receipt of new dough products. The present invention, therefore, can avoid conventional processes such as replacing the cloth for carrying dough products with a new cloth each time discharge is completed. It is also possible, according to the present invention, to clean and apply release agents to the belt at places underneath the core plate without removing the belt from the carrying plate assembly.

An object of the present invention is to provide a device which enables easy and satisfactory automatic removal and transfer to a subsequent zone of semi-processed dough products.

The above, and other objects, features and advantages of the invention will be apparent in the following detailed description of illustrative embodiments thereof which is to be read in connection with the accompanying drawing wherein:

FIG. 1 is a partially broken away perspective view of the carrying plate assembly in an embodiment of the present invention;

FIG. 2 is the rear view of said carrying plate assembly;

FIG. 3 is a schematic, cross-sectional view of an embodiment of the present invention particularly indicating the function of the roller and the belt at the transfer position.

Figure 4:
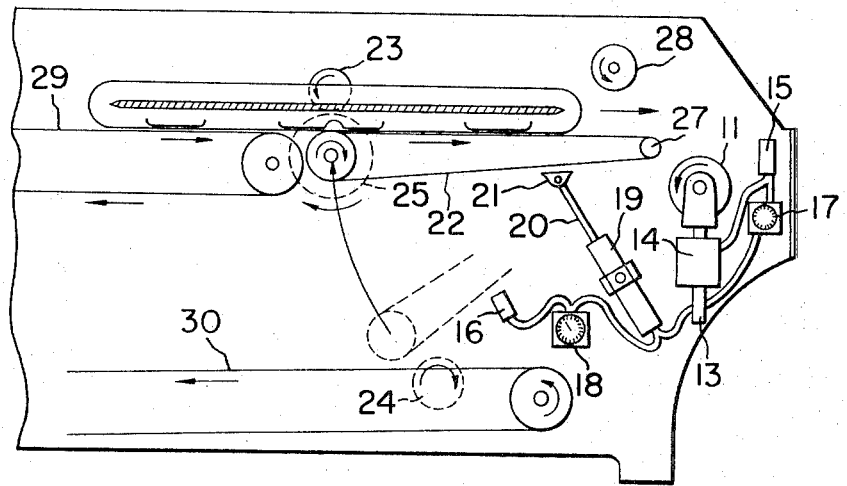
FIG. 4 through 7 are schematic, cross-sectional views of an embodiment of the present invention illustrating different positions of a carrying plate assembly before, at and after the transfer position.

Referring to FIG. 1, the carrying plate assembly 1 is designed for carrying divided and formed dough products through processing stages including the proofing stage to a point at which the dough products are to be transferred to a subsequent stage such as a band oven or a fryer. The core plate 5 is a flat and substantially rectangular plate normally provided with many holes 6 for the circulation of air. The front edge 8 and also preferably the rear edge 8 of the core plate 5 are acuted-angled or thin so that the flexible belt turns around the edge at a very small radius, thus enabling the belt to separate from the sticking dough products at the point of discharge. In case the belt turned at a large radius, dough products would move to the opposite side of the core plate along with the rotation of the belt and it would be difficult to remove the dough products from the belt. An endless flexible belt 3 covers tightly the upper and lower surfaces and the front and rear edges 8 of the core plate 5. The belt 3 is normally made of a piece of thin cloth or a thin and flexible plastic film, preferably with evenly distributed crosswise ridges or indentations on the surface. A pair of side boards 7 are attached to either side edge of the core plate 5 to prevent the belt 3 from slipping out of the plate.

Referring to FIG. 2, a bottom plate 9 is attached at its two sides to the lower surfaces of the side boards 7, spanning the core plate 5. The belt passes through the space between the bottom plate 9 and the core plate 5. The bottom plate is provided with a plurality of holes 10.

Referring to FIGS. 3 through 7, the roller 11 has many projections around its periphery and is arranged to rotate counterclockwise in FIG. 3. The roller is adapted for reciprocal vertical movements and when it is raised it is inserted through a hole 10 and at its uppermost position the projections are made to engage the belt 3 on the lower surface of the core plate 5. By the rotation of the roller, the belt is made to rotate around the core plate in the direction of *a* in FIG. 3. The bearing 12 of the roller 11 is supported by a shaft 13, which is adapted to make reciprocal, substantially vertical movements by means of a magnet 14. The magnet receives from the first approach switch 15 pulses which cause the magnet to move the shaft 13.

The carrying plate assembly 1 is mounted on a conveyor 29 before it approaches the transfer position. At the transfer position, the carrying plate assembly 1 is moved from the conveyor 29 to a conveyor 22, whose upper surface is substantially on the same level as the upper surface of the conveyor 29 and which is positioned adjacent to the conveyor 29 in the direction towards the transfer position.

The conveyor 22 comprises an endless belt rotatable around a roller 26 adjacent to the conveyor 29 and a roller 27 at the opposite end. A portion of the conveyor 22 is fixed to a joint 21, which in turn is connected to an arm 20. The arm 20 is arranged to move slidably in the geared motor 19 by the action of the latter.

Figure 5:
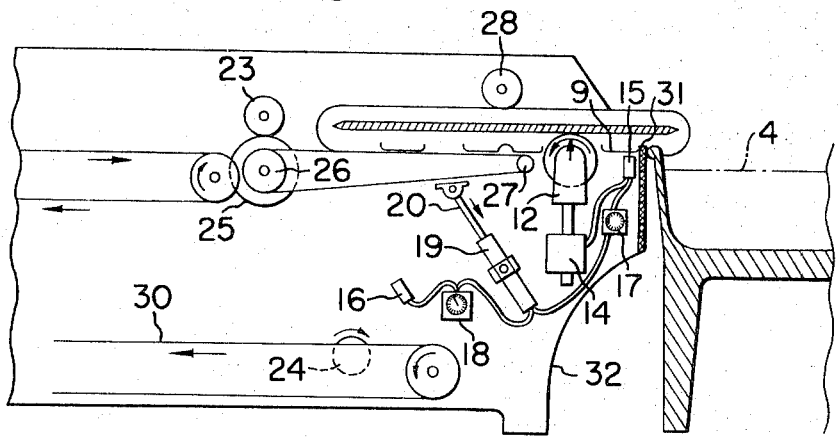
Figure 6:
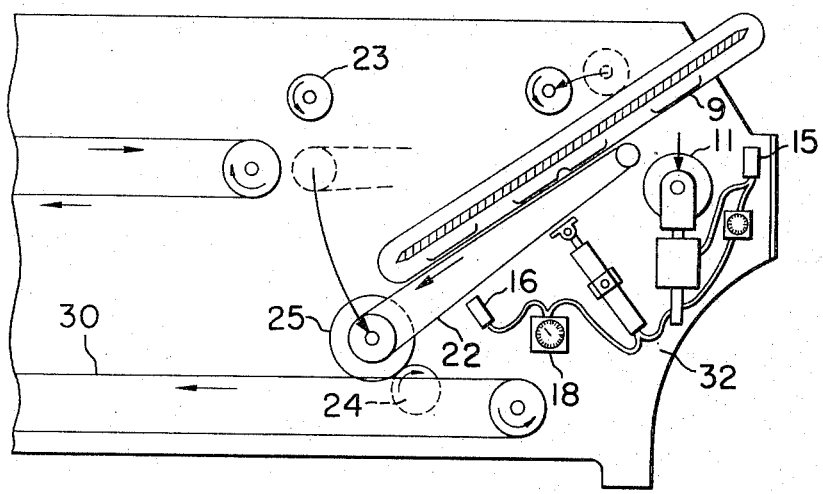
Figure 7:
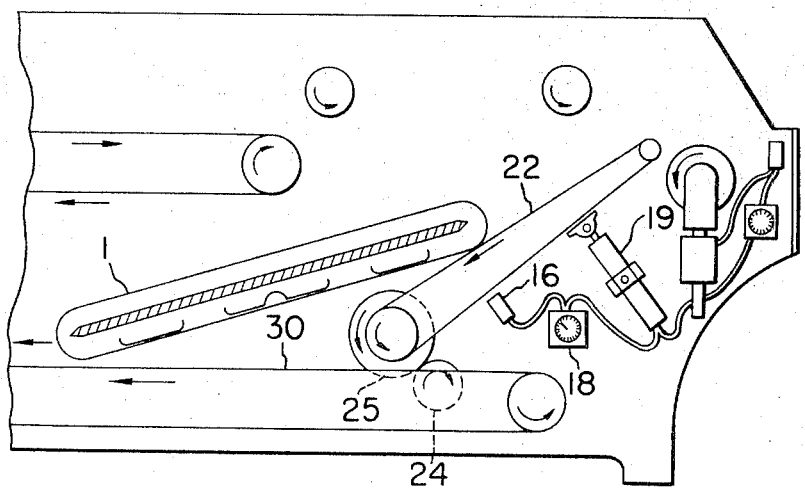
Figure 8:
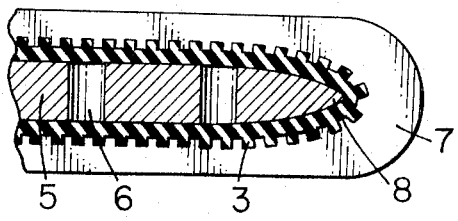
FIG. 8 is a cross-sectional view of the belt of the carrying plate assembly showing its evenly distributed crosswise ridges or indentations on its surface.

The conveyor 22 is adapted to swing around the roller 27 between a horizontal position as in FIGS. 4 and 5 and an inclined position as in FIGS. 6 and 7 by the motion of the arm 20. When the conveyor 22 is in the horizontal position, a gear 25 mounted on the shaft of the roller 26 meshes with a gear 23, which rotates counterclockwise in FIG. 4 and operates the conveyor 22 via the gear 25 and the roller 26. When the conveyor 22 is lowered to the inclined position, the gear 25 meshes with a gear 24, which imparts rotational movement to the belt of the conveyor 22 through the gear 25 and the roller 26. The direction of the rotation of the gear 24 is opposite that of the gear 23, thus causing the belt of the conveyor 22 to rotate in the opposite direction.

A roller 28 is fixed relative to the conveyor 22 at a position which is closer to the roller 27 and which permits the passage of the carrying plate assembly 1 between the roller 28 and the roller 27. The roller 28 guides the carrying plate assembly 1 when it passes on the conveyor 22. The roller 28 swings together with the conveyor 22 with the roller 27 as a fulcrum and rotates and stops synchronized with the movement of the conveyor 22.

The stop guide 31 at the foremost position of the device, at a portion of the housing 32, extends vertically so that its uppermost portion engages the front edge of the bottom plate 9 of the carrying plate assembly 1 when the carrying plate assembly 1 is brought to the foremost position as illustrated in FIGS. 3 and 5.

The first approach switch 15 is electrically connected to the gear 23, the magnet 14 and the first time switch 17. The time switch is further electrically connected to the geared motor 19. The first approach switch 15 senses the approach of the carrying plate assembly 1 and emits signals to the magnet 14, the first time switch 17 and the gear 23.

The second approach switch 16 is electrically connected to the second time switch 18, which in turn is electrically connected to the geared motor 19. The second approach switch 16 senses the approach of the carrying plate assembly 1 when the latter swings to the inclined position, and emits pulses to the second time switch 18.

The conveyor 30 is positioned underneath the conveyor 29 and the conveyor 22 on the level near that of the gear 24. It moves in the direction opposite to the movement of the conveyors 22 and 29, and it takes up the carrying plate assembly 1 after discharge of dough products.

The operation of the device of the present invention will be explained hereinafter following the movement of the carrying plate assembly 1. The carrying plate assembly 1 is forwarded by the conveyor 29 to the conveyor 22 as illustrated in FIG. 4. The forward movement of the carrying plate assembly 1 stops when the stop guide 31 engages the front edge of the bottom plate 9. At this stage, the carrying plate assembly comes within the sensing range of the approach switch 15, and thus the latter sends pulses to the gear 23 and the magnet 14. The rotation of the gear 23 stops by the signals from the approach switch 15 and consequently the movements of the conveyor 22 and the roller 28 are made to stop.

The roller 11 is elevated by the action of the magnet 14 taking signals from the approach switch 15, and going into a hole 10 in the bottom plate 9, engages the belt 3 at a portion underneath the core plate 5. The roller 11 then moves the belt 3 in the direction indicated by the arrow a. The belt 3 is made to move around the core plate 5 and the portion of the belt 3 on the top of the core plate 5 is then moved in the direction indicated by the arrow b. The dough products 2 carried on the belt are thus made to move along with the movement of the belt 3, and when each of the dough products 2 passes the front edge 8 of the core plate 5 it automatically drops into a fryer 4. As beforementioned, the dough products 2 usually stick to the belt 3 due to preceding heating in the proofing process. In the device of this invention, however, the edge 8 of the core plate 5 is acute-angled or substantially thin so that the belt 3 turns around the edge 8 at a very small radius and thus the belt 3 can be gradually and satisfactorily separated from the bottom portion of the dough product 2.

After a predetermined length of time from the receipt of signals from the first approach switch 15, the first time switch 17 send signals to the geared motor 19, so as to lower the arm 20 and to incline the conveyor 22 to the position indicated in FIG. 6. The above predetermined length of time is determined by the length of time sufficient for the discharge of all the dough products 2 on the carrying plate assembly 1 by the rotation of the belt 3. At this stage, the gear 25 disengages from the gear 23 and comes to mesh with the gear 24, which rotates the conveyor 22 in the opposite direction so as to send the carrying plate assembly 1 to the collecting conveyor 30 as illustrated in FIG. 7.

When the conveyor 22 is inclined as in FIG. 6, the bottom plate 9 of the carrying plate assembly 1 moves away from the first approach switch 15 and out of its sensing range. Consequently, the roller 11 returns to its retracted position as in FIG. 4 and the gear 23 starts rotation. Further, the inclined conveyor 22 enters the sensing range of the second approach switch 16 and thus the latter's pulses are sent to the timer 18. After a predetermined length of time, the geared motor 19 receives signals from the timer 18 to reverse the motion of the geared motor 19 and to extend the arm 20. The above predetermined length of time is determined by the time sufficient for the removal of the carrying plate assembly 1 from the conveyor 22. Thus, when the entire body of the carrying plate assembly 1 lands on the conveyor 30, the arm 20 returns the conveyor 22 to a horizontal position so as to receive the subsequent carrying plate assembly.

By the repetition of the above operations, dough products 2 brought forward to the transfer position on carrying plate assemblies 1 are successively and automatically separated from the carrying plate assemblies and fed to the subsequent processing stage.

The carrying plate assemblies which have completed discharge of dough products are automatically returned to the dough product receiving zone.

What I claim is:

1. A device for automatically conveying and transferring at a transfer position semi-manufactured dough products such as bread and doughnuts to a subsequent process stage such as a fryer or a band oven, comprising a carrying plate assembly having a core plate, support means supporting said core plate, an endless flexible belt made of material provided with evenly distributed laterally extending ridges on its exterior surface in contact with said dough products positioned around said core plate, a roller having projections around it, means for bringing the roller into or out of meshing relationship with the lower exterior surface of the belt at the transfer position where the dough products are transferred, and means for rotating the roller in the backward direction relative to the direction in which the dough products are to be transferred so as to rotate the belt around the core plate for transferring the dough products, comprising further a swingable conveyor for conveying said carrying plate assembly to said transfer station for transferring said dough products, said conveyor having a belt wound around two rollers positioned at the foremost and rearmost ends thereof, swingable around said foremost roller between a horizontal position and an inclined position, with said rearmost roller at a level below said foremost roller and coming into contact with driving means, which is adapted to reverse the direction of rotation of said conveyor belt.

2. The device according to claim 1 and further comprising a second conveyor for the return of the carrying plate assembly positioned underneath said swingable plate assembly conveyor.

3. The device according to claim 1, comprising an arm with its upper end connected to a joint fixed relative to the swingable conveyor and with its lower portion being slidable, a geared motor connected to said arm, first and second approach switches and first and second time switches, said switches being electrically connected to said motor, said arm being arranged to retract after a predetermined length of time from the carrying plate assembly approaches the transfer position by the coaction of the first approach switch, the first time switch and the geared motor, and to extend after a predetermined length of time by the coaction of the second approach switch, the second time switch and the geared motor.

4. The device according to claim 1 wherein the means for bringing the roller into or out of meshing relationship comprises a reciprocal shaft supporting the roller, an electromagnet arranged to move said shaft reciprocally, and a first approach switch, said electromagnet being activated by said first approach switch when the carrying plate assembly approaches the transfer position so as to elevate the roller for engaging the belt.

5. A device for automatically transferring semi-manufactured dough products such as bread and doughnuts to a subsequent processing stage at a transfer position such as a fryer or a band oven, comprising: a carrying plate assembly having an endless flexible belt rotatable around a core plate, means to support said core plate; a first conveyor for the forwarding of the carrying plate assembly when carrying dough products; a second conveyor having a foremost and a rearmost roller and being for the discharge of the dough products located at the transfer position on the extension of the first conveyor and swingable around its foremost roller and having around it a belt arranged to reverse the direction of rotation upon the completion of the swinging motion; a third conveyor for the return of the carrying plate assembly portioned underneath the first and the second conveyor, a first and a second approach switch each positioned at said transfer position; a core plate belt roller and a reciprocal shaft supporting said core plate belt roller, an electromagnet arranged to move said shaft reciprocally and being activated by the first approach switch when the carrying plate assembly approaches the transfer position so as to elevate the roller for engaging the belt; and an arm with its upper end connected to a joint fixed relative to the second conveyor and with its lower portion being slidable in a geared motor electrically connected to the first and the second approach switches, a first and a second time switch each connected to said motor, said arm being arranged to retract after a predetermined length of time from the time the carrying plate assembly approaches the transfer position by the coaction of the first approach switch, the first time switch and the geared motor, and to extend after a predetermined length of time by the coaction of the second approach switch, the second time switch and the geared motor.

* * * * *